US012501252B2

(12) United States Patent
Muhanna et al.

(10) Patent No.: US 12,501,252 B2
(45) Date of Patent: Dec. 16, 2025

(54) ROAMING HUB 5G INTERCONNECT FOR PUBLIC LINE MOBILE NETWORKS

(71) Applicant: Mavenir Networks, Inc., Richardson, TX (US)

(72) Inventors: Ahmad Muhanna, Richardson, TX (US); Martin Staron, Brno (SK)

(73) Assignee: Mavenir Networks, Inc., Richardson, TX (US)

( * ) Notice: Subject to any disclaimer, the term of this patent is extended or adjusted under 35 U.S.C. 154(b) by 369 days.

(21) Appl. No.: 18/176,782

(22) Filed: Mar. 1, 2023

(65) Prior Publication Data
US 2023/0284008 A1      Sep. 7, 2023

Related U.S. Application Data

(60) Provisional application No. 63/315,106, filed on Mar. 1, 2022.

(51) Int. Cl.
*H04W 8/08*  (2009.01)
*H04W 76/16* (2018.01)
*H04W 84/04* (2009.01)

(52) U.S. Cl.
CPC ........... *H04W 8/082* (2013.01); *H04W 76/16* (2018.02); *H04W 84/042* (2013.01)

(58) Field of Classification Search
CPC ... H04W 8/082; H04W 76/16; H04W 84/042; H04W 8/12
See application file for complete search history.

(56) References Cited

U.S. PATENT DOCUMENTS

| | | | |
|---|---|---|---|
| 11,533,358 B1 * | 12/2022 | Khare | H04L 69/22 |
| 11,843,956 B2 * | 12/2023 | Colom Ikuno | H04W 24/02 |
| 2010/0316029 A1 | 12/2010 | Kappler et al. | |
| 2019/0037398 A1 * | 1/2019 | Eriksson | H04L 63/0272 |
| 2021/0014680 A1 * | 1/2021 | Saarinen | H04L 63/12 |
| 2021/0211860 A1 * | 7/2021 | Rajadurai | H04L 9/3247 |
| 2022/0104112 A1 * | 3/2022 | Rajput | H04L 67/56 |

OTHER PUBLICATIONS

Keller, Ralf, et al. "Roaming in the 5G system: The 5GS roaming architecture." Ericsson Technology Review Jun. 2021 (2021): 2-11. (Year: 2021).*
Extended European Search Report for corresponding European Patent Application No. 23159508.3, 16 pages, dated Jul. 24, 2023.
Ericsson: "Discussion On The GSMA LS On Roaming Hub Support", 3GPP Draft; S3-214293, 3rd Generation Partnership Project (3GPP), Mobile Competence Centre ; 650, Route Des Lucioles ; F-06921 Sophia-Antipolis Cedex ; France, vol. SA WG3, No. E-Meeting; Nov. 8, 2021-Nov. 19, 2021 Nov. 1, 2021 (Nov. 1, 2021), XP052073702.

(Continued)

*Primary Examiner* — Sharad Rampuria
(74) *Attorney, Agent, or Firm* — Ruggiero McAllister & McMahon LLC

(57) ABSTRACT

A method and an architecture for the Roaming Hub that can be configured to establish interconnectivity between any visiting Public Line Mobile Network (PLMN) and home PLMN as long as the visiting PLMN and the Home PLMN has a roaming agreement with the Roaming Hub.

19 Claims, 13 Drawing Sheets

(56) References Cited

OTHER PUBLICATIONS

"5GMRR#19 Doc 011r2 LS to 3GPP SA3 Working Group on 5GS Roaming Hubbing",3gpp Draft; S3-213806, 3rd Generation Partnership Project (3GPP), Mobile Competence Centre ; 650, Route Des Lucioles ; F-06921 Sophia-Antipolis Cedex ; France, No. Aug. 13, 2021 Oct. 25, 2021 (Oct. 25, 2021), XP052063937.
3GPP TS 33.501 v17.4.2 "3rd Generation Partnership Project;Technical Specification Group Services and System Aspects; Security architecture and procedures for 5G system (Release 17)" 3GPP , Jan. 2022, Valbonne, France.
3GPP TS 29.573 V17.3.0 "3rd Generation Partnership Project;Technical Specification Group Core Network and Terminals;5G System; Public Land Mobile Network (PLMN) Interconnection;Stage 3 (Release 17)", 3GPP, Dec. 2021, Valbonne, France.
GSMA, "AA.73 Roaming Hubbing Client to Provider Agreement" version 8.3, Apr. 2020.

* cited by examiner

ROAMING HUB 5G INTERCONNECT FOR PUBLIC LINE MOBILE NETWORKS

CROSS-REFERENCE TO RELATED APPLICATIONS

The present application claims the benefit of U.S. Provisional Patent Application No. 63/315,106 having a filing date of Mar. 1, 2022, which is incorporated by reference herein in its entirety.

BACKGROUND OF THE DISCLOSURE

1. Field of the Disclosure 5G 3GPP Service Based Architectures.

2. Description of the Related Art

3GPP developed a solution for roaming interconnect where a new Security Edge Protection Proxy (SEPP) was defined to be sitting at the edge of the operator 5GC and a relay between the local PLMN 5GC network functions and the remote roaming PLMN partner SEPP. The 3GPP Interconnect solution counted for the main use case of intermediaries between the roaming partners, i.e., IPX providers.

An IPX provider usually offers different levels of service, which range from plain IP routing, monitoring, addition or modification of roaming signaling traffic between the two roaming partners.

In order to provide the IPX provider a secure and flexible mechanism to offer its services, 3GPP developed an Application Level Security protocol that is referenced as PRINS.

The interconnect interface between roaming partners is referenced as N32 interface, which has two components; N32-C and N32-f. N32-c is used for TLS control plane to negotiate the security capabilities and establish a N32-f session that is used for exchanged roaming signaling traffic between the roaming partners. FIGS. 2A-2B show an exemplary high level logical architecture and graph for SEPP and all control plane interfaces that can be exchanged over the interconnect N32-f.

A Roaming Hub (RH) is used to simplify roaming connectivity between the different operators where one operator can have a roaming agreement with the Roaming Hub only, and the RH can have roaming agreements with the rest of the operators. This way, small operators do not need to worry about bilateral roaming agreements with all roaming partners out there, where the number could reach 400 or more, but worry only about one roaming agreement with the RH.

RH works like a wholesaler for roaming connectivity to other roaming Public Line Mobile Network (PLMN) partners. This means that when a visiting PLMN would like to provide roaming service to another Home PLMN subscriber, the visiting PLMN does not have a prior roaming agreement and possibly has no knowledge of the reachability of the roaming subscriber of the home PLMN SEPP; however, the visiting PLMN has all the information needed to reach the RH, which has all information to reach the home PLMN.

An RH use case could be looked at as PLMNs delegating their roaming agreement and connectivity to the RH. In other words, RH SEPP can be looked at by the visiting SEPP as the delegated SEPP for many PLMNs which have a roaming agreement with the RH.

The problem statement is as shown in FIGS. 2A-2B, where the interface and how the RH SEPP can be configured used to establish the interconnectivity between the visiting PLMN SEPP (cSEPP) and the Home PLMN SEPP (pSEPP) is undefined in 3GPP.

FIG. 1 shows an architecture for a 3GPP interconnection signaling and UP Protection in accord with T523.501 v16.11.0 and T533.501 16.9.0S. FIG. 2A shows a breakout of SEPP and the protected 3GPP interfaces. FIG. 2B shows a breakout of home-routed SEPP and the protected 3GPP interfaces.

As shown in FIG. 1 and FIGS. 2A-2B, a SEPP definition and main functionality includes message filtering and policing on inter-PLMN control plane interfaces. The SEPP also is configured for topology hiding. The SEPP secures inter-PLMN CP signaling, thus acting as a service relay. For a producer and a consumer, the service relay is configured to act like a direct communication. Every inter-PLMN signaling between a cSEPP and a pSEPP can pass via IPX entities.

A 5G system architecture introduces the SEPP as an entity sitting at the perimeter of the PLMN for protecting control plane messages. The SEPP enforces inter-PLMN security on N32.

As shown in FIGS. 1 and 2B, the IPUPS main functionality includes forwarding valid GPRS Tunnelling Protocol (GTP-U) traffic from N9 interface and discard non-valid GTP-U traffic.

FIG. 3 shows an exemplary logical architecture and use case demonstrating how business roaming agreements are implemented for the RH. As shown in FIG. 3, a VPLMN has a roaming agreement with the RH and no agreement with HPLMN. Similarly, a HPLMN has a roaming agreement with RH but not with the VPLMN. Thus, communication between RH SEPPs are undefined.

SUMMARY

The present disclosure provides a method and an architecture for the Roaming Hub where the RH SEPP(s) can be configured to establish interconnectivity between any visiting PLMN and home PLMN as long as the visiting PLMN and the Home PLMN has a roaming agreement with the Roaming Hub.

The present disclosure provides a solution for 5G Interconnect through a public or an operator group Roaming Hub where the VPMN and HPMN has no prior business relationship while each one of them has a business relationship with the RH.

In an implementation, described is a system comprising a Roaming Hub (RH) comprising a hosted RH SEPP including a plurality of SEPP instances, the hosted SEPP comprising: a producer SEPP (pRH SEPP) including an interface to a visiting PMN (vPMN) SEPP; and a consumer SEPP (cRH SEPP) including an interface to a home PMN (HPNN) SEPP, wherein the hosted RHSEPP is configured to establish 5G interconnectivity between any visiting PLMN and home PLMN that has a roaming agreement with the RH. The pRH-SEPP can be configured to advertise to the vPMN a plurality of HPMN PLMN-IDs for all HPMNs that can have subscribers roam into the VPMN and ensure only allowed PLMN-IDs are negotiated during a 5G interconnect connection setup. The system can be configured to generate and message a certificate of the pRH-SEPP that includes a RH PLMN-ID and a plurality of VPMN PLMN-IDs of all VPMNs that the RH represents towards the HPMN. The system can be is configured to generate and message a cRH-SEPP certificate that includes the RH PLMN-ID and a plurality of HPNM PLMN-ID of all HPMNs that the RH represents towards the VPMN.

In an implementation, the RH comprises an RH SCP. The RH SCP can be configured as a single RH SCP instance, or the RH SCP can be configured to operate as a micro-service of the RH-SEPP. The RH can comprise a rhSBI bus extended within the RH between the pRH-SEPP and cRH-SEPP and can be configured to allow the pRH-SEPP to terminate traffic over to the rhSBI towards the rhSCP. A rhSBI bus can also be configured to allow the cRH-SEPP to communicate with HPMN pSEPP based on a 3GPP 5G interconnect protocol with security mode of a TLS or a PRINS.

In an implementation, the RH can further comprise an RVAS, and the rhSCP can be configured to offload all routing criteria to the RVAS.

In an implementation, the system can further comprise an rhNRF and an rhSBI bus, the rhSBI bus connecting the rhNRF and the rhSCP.

In an implementation, described is a method comprising: accepting a 5G connection message from a vPMN for an hPNM at a hosted Roaming Hub (RH) having a roaming agreement with each of the vPMN and the hPNM, the hPNM not having an agreement with the vPNM; and establishing a 5G connection between a vPMN and an hPNM via the Roaming Hub. A NRF of the vPMN (vNRF) can be configured to generate the connection message targeting an NRF within the RH (rhNRF). The rhNRF can be configured to target the connection message for an NRF of the HPNM (hNRF) and forward the connection message to the hPNM. A SEPP of the RH can be configured to accept and validate a PNM-ID of the connection message from the vPNM. A SEPP of the hPNM can be configured to validate a PLNM-ID of the connection message. In an implementation, a NRF of the vPMN (vNRF) is configured to generate a common FQDN for a NRF of the hPNM (hNRF) based on a PLMN-ID of the hPMN.

In an implementation, described is a method comprising: accepting a 5G connection message from a vPMN for an hPNM at a Roaming Hub having a roaming agreement with each of the vPMN and the hPNM, the hPNM having a roaming agreement with the vPNM; and establishing a 5G connection between a vPMN and an hPNM via the Roaming Hub. An NRF of the vPMN (vNRF) can be aware of the reachability of a NRF of the HPNM (hNRF). In an implementation, the RH does not include or use a NRF of the RH (rhNRF).

DETAILED DESCRIPTION

Reference is made to Third Generation Partnership Project (3GPP) and the Internet Engineering Task Force (IETF) in accordance with embodiments of the present disclosure. The present disclosure employs abbreviations, terms and technology defined in accord with Third Generation Partnership Project (3GPP) and/or Internet Engineering Task Force (IETF) technology standards and papers, including the following standards and definitions. 3GPP and IETF technical specifications (TS), standards (including proposed standards), technical reports (TR) and other papers are incorporated by reference in their entirety hereby, define the related terms and architecture reference models that follow.

GSMA, AA.73 Roaming Hubbing Client to Provider Agreement, version 8.2, April 2021

3GPP TS 33.501: "Security architecture and procedures for 5G system 3GPP TS 29.573:"Public Land Mobile Network (PLMN) Interconnection; Stage 3".

Glossary of Terms:
5GC: 5G Core
cNF: Network Function service consumer, takes the role of client for Oauth 2.0.
pNF: Network function service producer, takes the role of resource server for Oauth 2.0.
NRF: Network Repository Function, the role of authorization server for Oauth 2.0.
TLS: Transport Layer Security protocol.
IPUPS Inter PLMN UP Security
SCP: Service Communication Proxy
SBA: Service Based Architecture
SBI: Service Based Interface
5GS: 5G System
Oauth2.0: The OAuth 2.0 Authorization Framework protocol
Http: Hypertext Transfer Protocol
CA: Certificate Authority
3GPP: 3rd Generation Partnership Project
Access token: Authorization is provided in the form of JWT, which is called access token, which is signed by the private key of the authorization server, i.e., NRF.
Hierarchal NRF: A hierarchy of NRF(s) where a local NRF may serve a specific region with the same PLMN or serve one PLMN ID within the same operators that own multiple PLMN IDs.
RHUB: Roaming Hub also referred to as RH.
vNRF: Visited NRF
hNRF: home NRF
rhNRF: RHUB NRF
PLMN: Public Line Mobile Network
VPLMN: visited PLMN
HPLMN: Home PLMN
PRINS: Protocol for N32 Interconnect Security
PLMN-ID: usually mcc plus mnc assigned to a PLMN
FQDB: Fully Qualified Domain Name
AMF: Access and Mobility Management Function
AUSF: Authentication Server Function SEPP: Security Edge Protection Proxy N32: Reference point interface for roaming between mobile operators, interconnect interface N32-c: N32 interface for TLS Control plane.

N32-f: N32 flow interface for Http signaling over the Interconnect interface.

Figure 1:
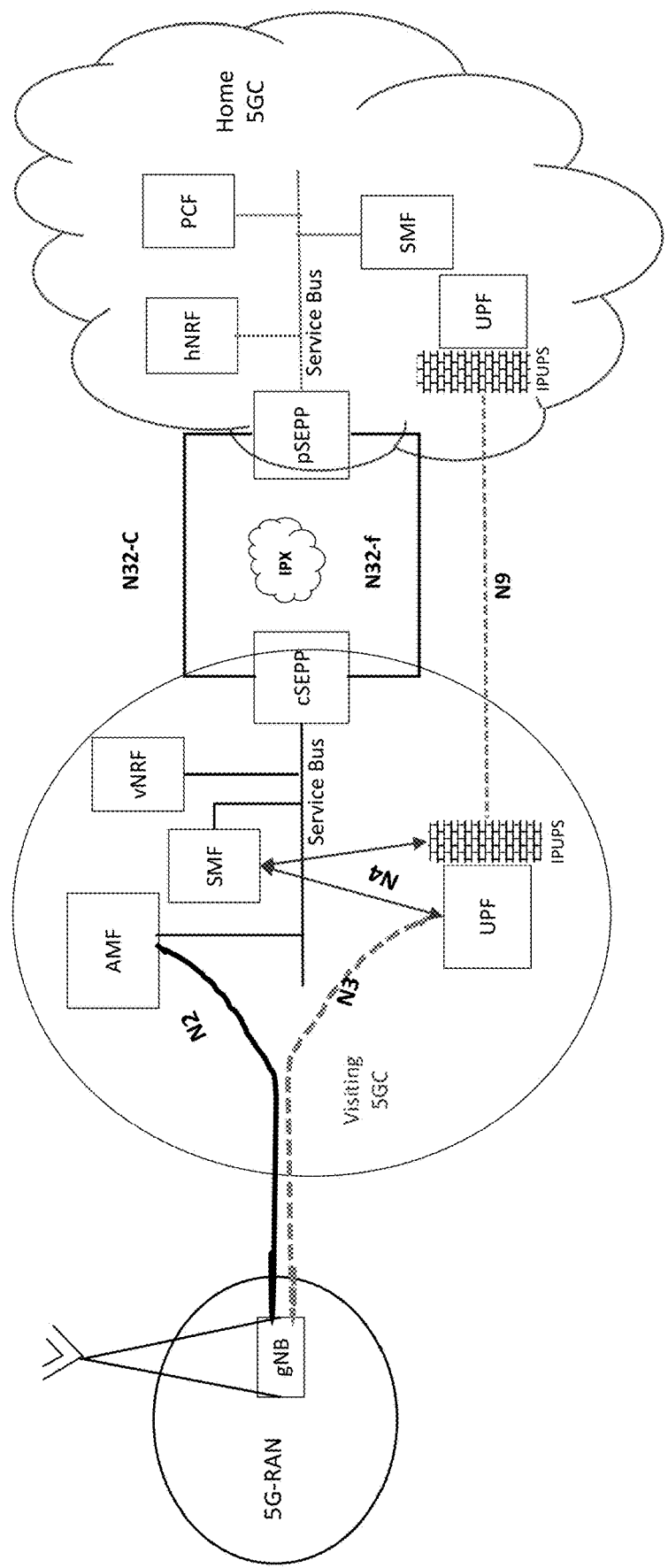
FIG. 1 shows an architecture for 3GPP interconnection signaling.
Figure 2A:
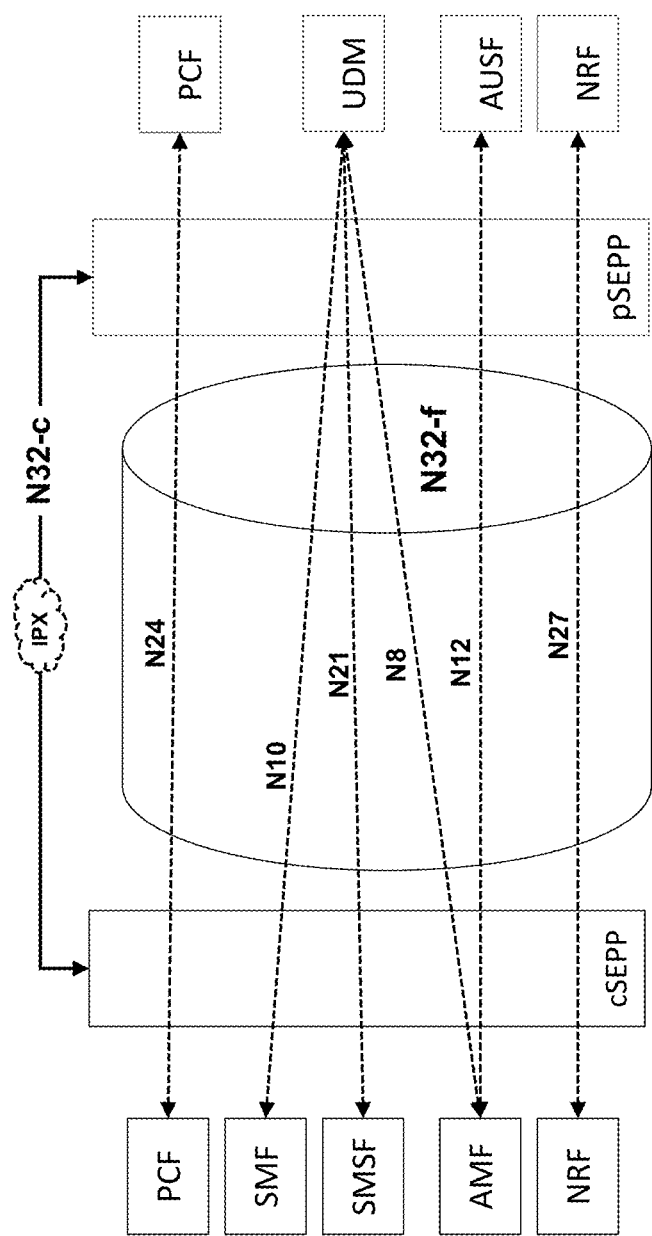
FIG. 2A shows an exemplary high level logical architecture and graph for SEPP and control plane interfaces that can be exchanged over the interconnect N32f.
Figure 2B:
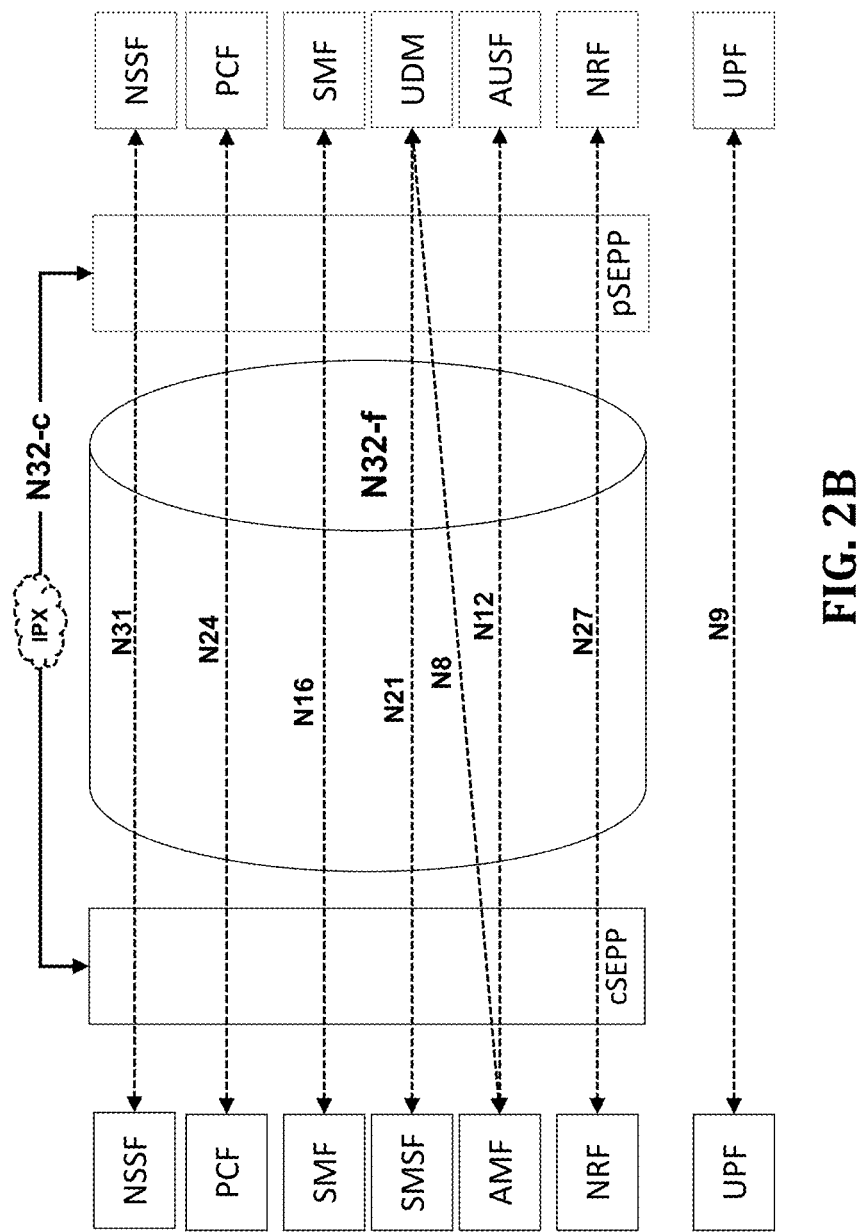
FIG. 2B shows an exemplary high level logical architecture and graph for SEPP and control plane interfaces that can be exchanged over the interconnect N32f.
Figure 3:
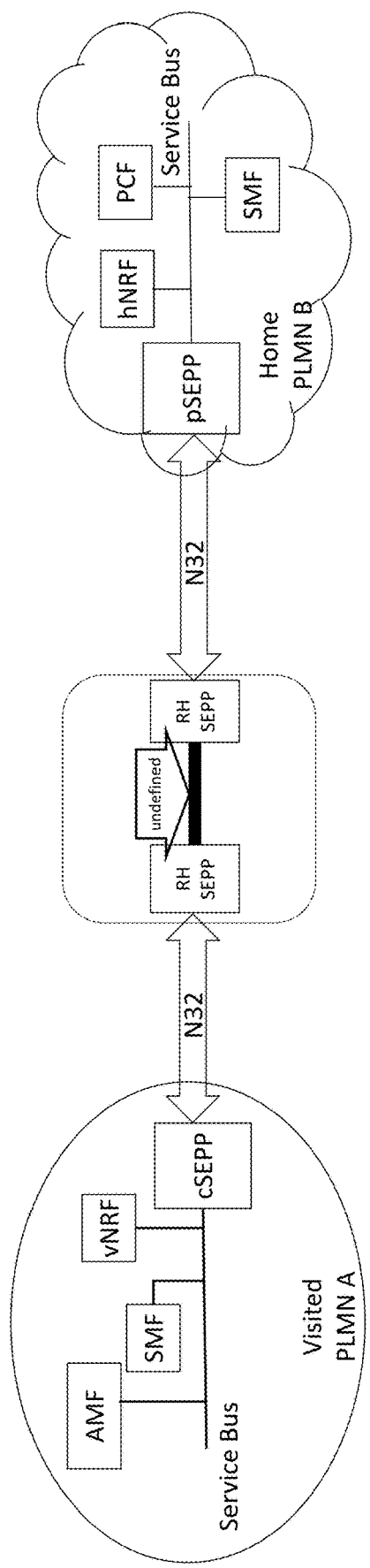
FIG. 3 shows an exemplary logical architecture and use case demonstrating how business roaming agreements are implemented for an RH.
Figure 4:
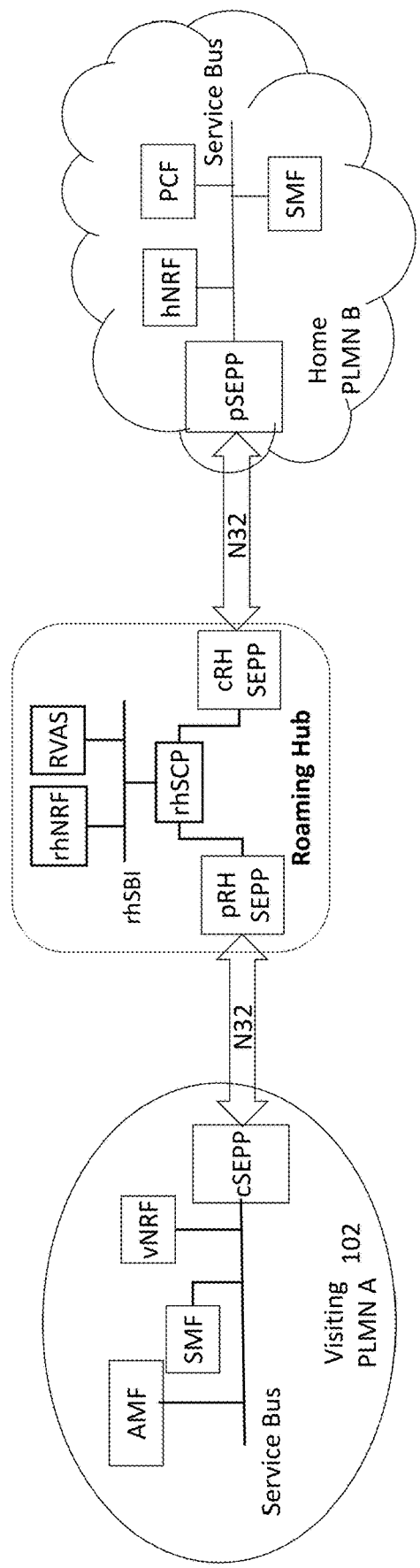
FIG. 4 shows an exemplary architecture for a Roaming Hub architecture solution.

In an implementation, disclosed is a Roaming Hub Architecture solution. FIG. 4 shows an exemplary architecture for a Roaming Hub architecture 100 solution. In the implementation, the RH Architecture conforms with, for example, 3GPP TS 29.573, option 2. In the implementation shown in FIG. 4, there is no prior business communication between Visiting PLMN A 102 and Home PLMN B 104. The vNRF knows only the reachability of rhNRF (FQDN) only. The rhNRF is aware of the reachability of the hNRF. In an optional implementation, the vNRF can register its profile (with information as needed) with the rhNRF. Similarly, the hNRF can register its profile with the rhNRF. The pRH SEPP is configured such that it is the producer RH SEPP with respect to the consumer cSEPP of the visiting PLMN A. The cRH SEPP is configured such that it is the consumer RH SEPP with respect to the producer pSEPP of the home PLMN B.

The reachability of rhNRF is preconfigured at the vNRF, i.e., at the NRF of the roaming partner that has a roaming agreement with the Roaming Hub, or is discovered dynamically based on RH PLMN-ID if a PLMN-ID is assigned to the RH or based on rhNRF FQDN that belongs to the owner of the RH.

If there is a business relationship between a visiting PLMN A and a Home PLMN B, then the reachability of hNRF is preconfigured in the vNRF, or vNRF uses a common FQDN to identify the hNRF.

All visiting PLMN A interconnect signaling traffic with other PLMNs that are covered by the RH are directed to pRH-SEPP.

One N32 connection from the visiting PLMN A cSEPP to the pRH-SEPP is allowed per PLMN-ID of the visiting PLMN. However, one N32 connection can be used for all PLMN-IDs of the visiting PLMN A. Based on agreement between the RH and visiting PLMN, the RH based on configuration will negotiate N32 connection with the home PLMNs based on the established connection(s) with the visiting PLMN. For example, if a separate N32c is established between the pRH-SEPP and cSEPP for each PLMN-ID of the visiting PLMN, the cRH-SEPP is configured to establish one N32 connection for each PLMN-ID of the visiting network to the home PLMN pSEPP.

Similarly, the RH can establish one or more N32-f connections with the home PLMN on behalf of the visiting PLMNs, with each connection serving a subset of visiting PLMNs represented by the RH. The RH is configured to announce the selected subset of PLMNs during the N32-c Security Capability Negotiation procedure that precedes the creation of each N32-f connection.

When the pRH-SEPP negotiates N32-C with the cSEPP of the visiting PLMN A, pRH-SEPP is able to represent all home PLMN-IDs that are allowed for possible roaming with the visiting PLMN A cSEPP. This can be based on local configuration at the pRH-SEPP. This list of home PLMN-IDs is a subset of all the home PLMN-IDs that have roaming agreement(s) with the RH.

In an implementation, the pRH-SEPP certificate can be configured to include the RH PLMN-ID if assigned or all the home PLMN-IDs that the RH is able to represent to the visiting PLMN.

NF Discovery in the Home PLMN Via RH

Figure 5A:
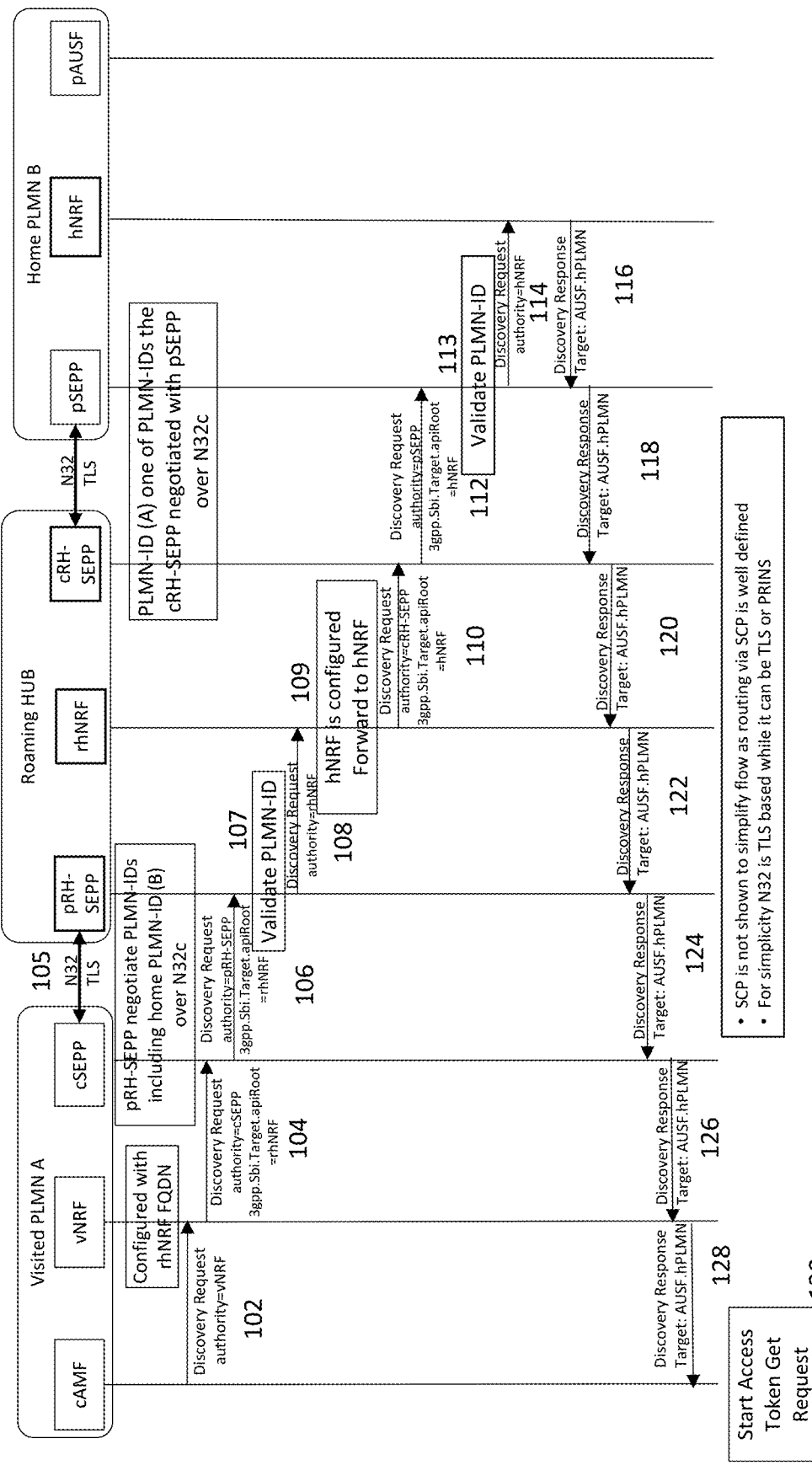
FIG. 5A shows an implementation of logical flow for NF Discovery in the Home PLMN via the RH.

FIG. 5A shows an implementation of logical flow for NF Discovery in the Home PLMN via the RH.

As shown in FIG. 5A, at block 102 the 5G cAMF in the visiting PLMN A sends a Discovery Request to its local vNRF.

The local vNRF identifies that the target NF service producer belongs to a foreign PLMN and based on local configuration, the vNRF is pointed to the rhNRF for discovering the foreign PLMN B hNRF.

At block 104, the vNRF sends the Discovery request to the visiting PLMN A local SEPP, i.e., cSEPP. Communication between the vNRF and the cSEPP can be a direct communication or via SCP. In case of direct communication, vNRF sets the 3gpp.target.sbi.apiroot header to rhNRF while it sets the authority header to cSEPP. The vNRF is configured with the rhNRF FQDN. In case of indirect communication, the vNRF sets the 3gpp.target.sbi.apiroot header to rhNRF and it sets the authority header to SCP. Because the 3gpp.target.sbi.apiroot header includes a foreign NRF, the SCP discovers or is configured with the cSEPP; and SCP sets the authority header to cSEPP and keeps the 3gpp.target.sbi.apiroot header unchanged. For purposes of simplifying the presentation, in FIGS. 5A-5B, the SCP and SCP routing flow is not shown.

Figure 5B:
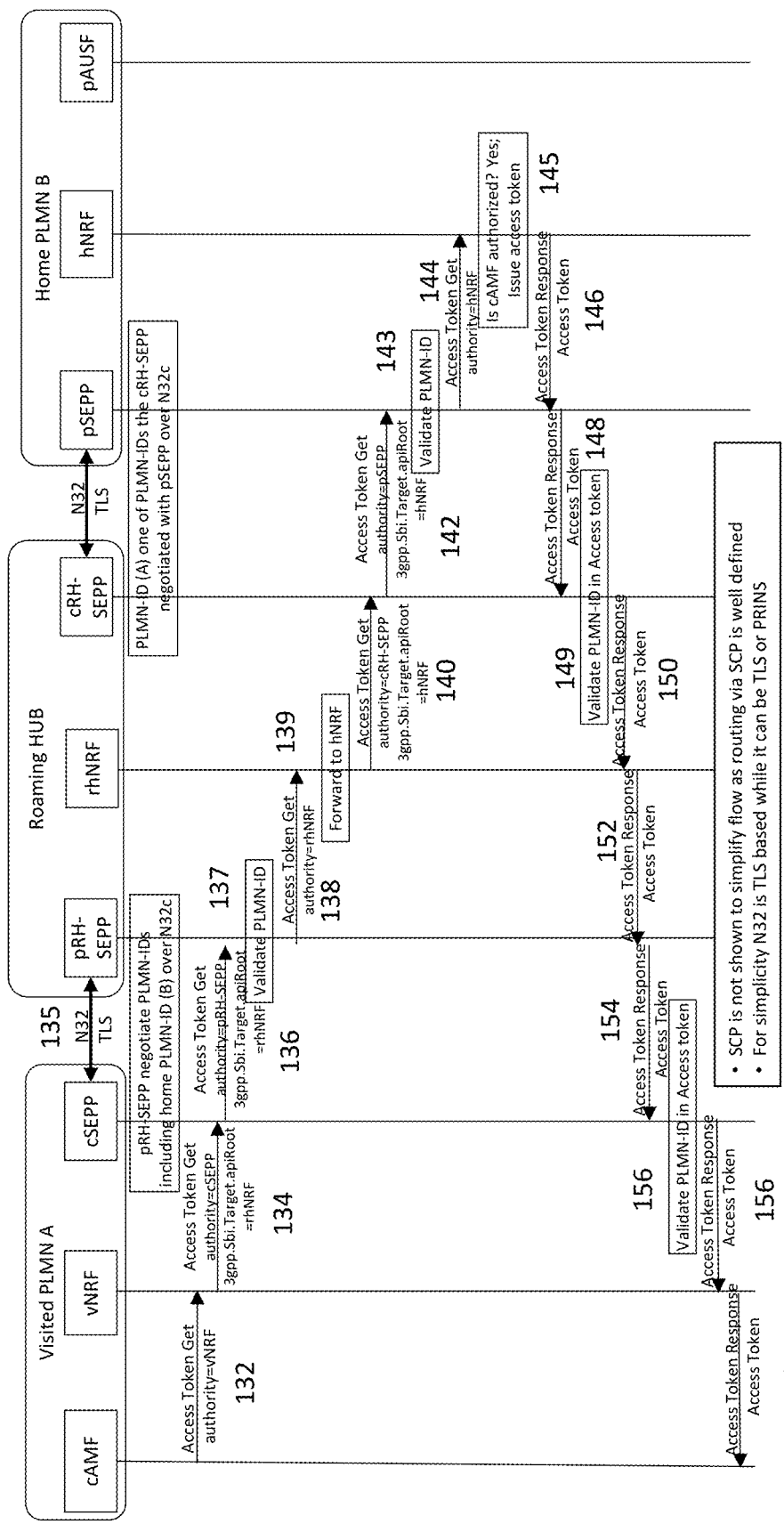
FIG. 5B shows an implementation of logical flow for a Access Token Get via the RH.
Figure 5C:
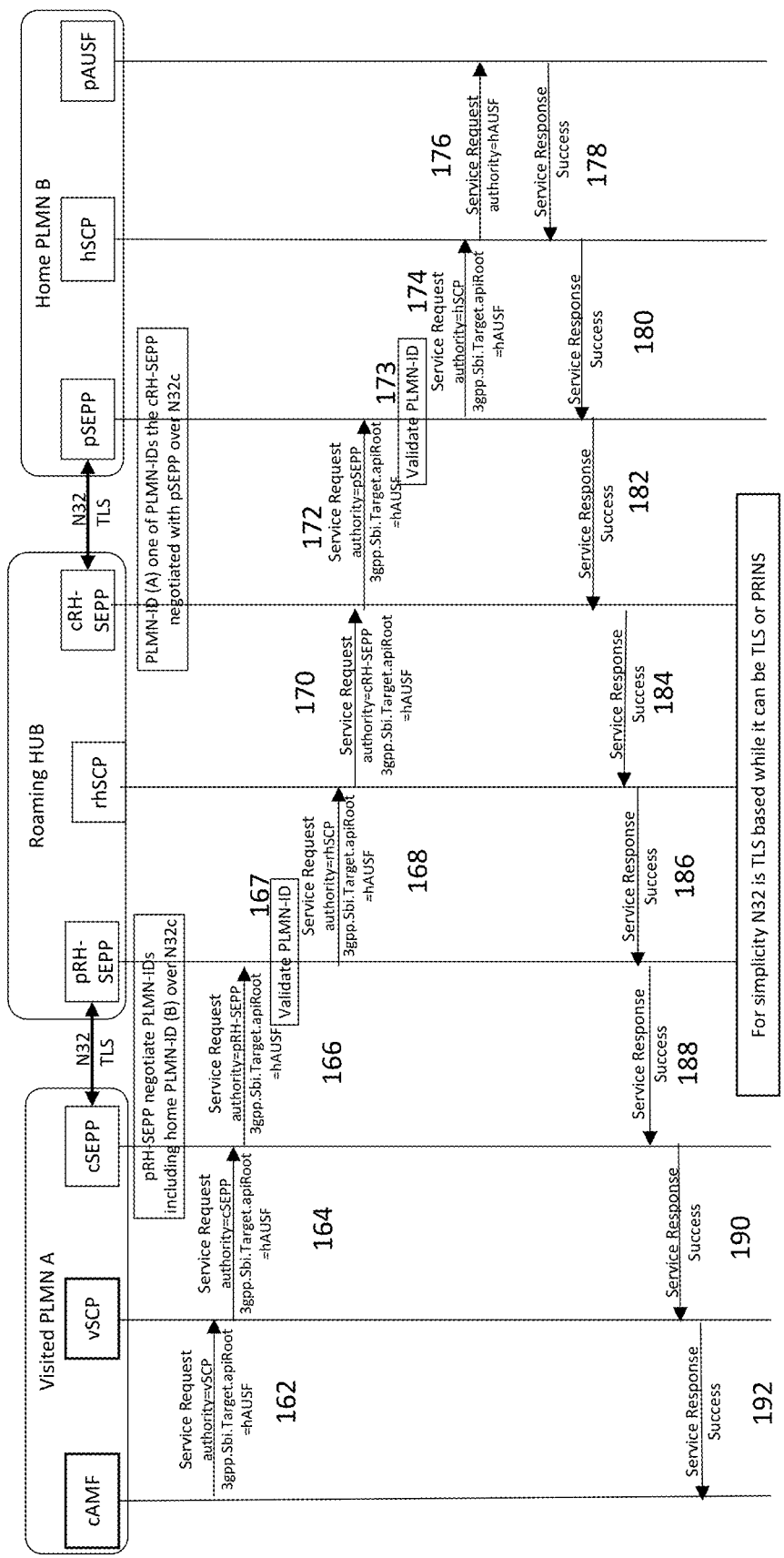
FIG. 5C shows an implementation of logical flow for a cAMF Service Request to pAUSF via RH.

When cSEPP receives the Discovery request with 3gpp.target.sbi.apiroot header pointing to the rhNRF, at block 105 the cSEPP establishes a new N32-c connection with a new N32-f (if one is not already established), and at block 106, communicates the Discovery Request over N32-f to the pRH-SEPP. If the connection between cSEPP and pRH-SEPP is TLS only, the cSEPP sets the Authority header to pRH-SEPP and leaves the 3gpp.target.sbi.apiroot header as is pointing to the rhNRF. If the connection is PRINS, the cSEPP reformats the message in PRINS format and sets the Request URI to pRH-SEPP FQDN. As shown in FIGS. 5A-5C, for simplification of presentation, N32 is shown as TLS based, however it can be TLS or PRINS.

The pRH-SEPP receives the Discovery Request from cSEPP over two options. First, at block 107 it validates that the PLMN ID received in the Discovery Request belongs to the visited PLMN A as negotiated with cSEPP over N32c. For TLS, the pRH-SEPP recovers the rhNRF FQDN from the 3gpp.sbi.target.apiroot header and then, at block 108, sends the Discovery Request to the rhNRF by setting the authority header to rhNRF in case of direct communication, or if via SCP, it keeps the 3gpp.sbi.target.apiroot as rhNRF FQDN and sets the authority header to rh-SCP. For PRINS, the pRH-SEPP reformats the PRINS message to http and recovers the rhNRF FQDN, and then sets the authority header to rhNRF in case of direct communication, or sets the 3gbb.sbi.target.apiroot to rhNRF FQDN and the authority header to rh-SCP. The rhNRF then receives the Discovery Request either over direct communication or via rh-SCP.

At block 109, the rhNRF identifies target HPMN and, based on the configuration, forwards the Discovery Request to hNRF where originator of the service invocation to hNRF is the rhNRF.

At block 110, the rhNRF sends the Discovery request to the cRH-SEPP either via direct communication or over rh-SCP. In this case, the 5GC NF in the visiting PLMN A, sends a Discovery Request to its local vNRF. For direct communication, the rhNRF sets the authority header to cRH-SEPP and the 3gpp.sbi.target.apiroot to hNRF. For indirect communication, the rhNRF sets the authority header to SCP and the 3gpp.sbi.target.abiroot to hNRF.

At block 112, the cRH-SEPP receives the Discovery Request and relays the request to the hSEPP; either over TLS or PRINS. For TLS: the cRH-SEPP sets the authority header to pSEPP and the 3gpp.sbi.target.apiroot to hNRF. For PRINS: the cRH-SEPP reformats the Discovery Request to PRINS format and sets the Request URI to pSEPP FQDN.

As per current 3GPP specification, if the security between the RH SEPP and the other SEPPs is based on TLS, the RH SEPP needs to use a dedicated certificate with a distinct identity (SAN FQDN) for each subset PLMN-IDs.

The pSEPP receives the Discovery Request from cRH-SEPP over two options: first, at block 113 the pSEPP validates that the PLMN ID received in Discovery Request belongs to one of the PLMN-IDs that was negotiated with the cRH-SEPP as can be served by the RH. For TLS, the pSEPP recovers the hNRF FQDN from the 3gpp.sbi.target.apiroot header and then, at block 114, sends Discovery Request to the hNRF by setting the authority header to hNRF in case of direct communication or, if via SCP, it keeps 3gpp.sbi.target.apiroot as hNRF FQDN and sets the authority header to SCP. For PRINS, the pSEPP reformats the PRINS message to http and recovers the hNRF FQDN and then sets the authority header to hNRF in case of direct communication, or sets the 3gbb.sbi.target.apiroot to hNRF FQDN and the authority header to SCP in case of indirect communication.

The hNRF receives the Discovery request either directly from pSEPP or via the SCP if present. The hNRF processes the Discovery Request and as the invoker of the service request is a trusted rhNRF with a business relationship with the hNRF, the hNRF processes the Discovery Request and identifies the target NF Service Producer or Producers in the HPLMN network.

At block 116, hNRF sends the Http Response to the pSEPP either directly or via SCP.

The pSEPP performs topology hiding for the discovered NF service producer in HPLMN before sending the Http response to the cRH-SEPP at block 118 and then to the rhNRF at block 120.

The RH can provide topology hiding service to its roaming customers and if that is the case, the cRH-SEPP performs the topology hiding before sending the http response to rhNRF. Alternatively, This service could be done via the pRH-SEPP.

At block 122, rhNRF sends the response to the pRH-SEPP, and at block 124, the pRH-SEPP sends the Http response to cSEPP.

At block 126 the cSEPP sends the Http response to the vNRF.

At block 128, The vNRF send the Discovery Response to the NF Service Consumer, e.g., AMD, in the VPLMN network either directly or over SCP.

At block 130, The NF service consumer decides whether to allocate an access token or sends a service request to target NF service producer in HPLMN.

Access Token Request Get via RH

FIG. 5B shows an implementation of logical flow for Access Token Get via the RH.

As shown in FIG. 5B, at block 132 the 5G CNF in the visiting PLMN A sends an Access Token Get to its local vNRF.

The local vNRF identifies that the target NF service producer belongs to a foreign PLMN and based on local configuration, the vNRF is pointed to the rhNRF for discovering the foreign PLMN B hNRF.

At block 134, the vNRF sends the Access Token Get to the visiting PLMN A local SEPP, i.e., cSEPP. Communication between the vNRF and the cSEPP can be a direct communication or via SCP. In case of direct communication, vNRF sets the 3gpp.target.sbi.apiroot header to rhNRF while it sets the authority header to cSEPP. The vNRF is configured with the rhNRF FQDN. In case of indirect communication, the vNRF sets the 3gpp.target.sbi.apiroot header to rhNRF while it sets the authority header to SCP. Because the 3gpp.target.sbi.apiroot header includes a foreign NRF, the SCP having discovered or being configured with cSEPP, SCP sets the authority header to cSEPP and keeps the 3gpp.target.sbi.apiroot header unchanged.

When cSEPP receives the Access Token Get with 3gpp.target.sbi.apiroot header pointing to the rhNRF, at block 135 the cSEPP establishes a new N32-c connection with a new N32-f (if one is not already established), and at block 136, communicates the Access Token Get over N32-f to the pRH-SEPP. If the connection between cSEPP and pRH-SEPP is TLS only, the cSEPP sets the Authority header to pRH-SEPP and leaves the 3gpp.target.sbi.apiroot header as is pointing to the rhNRF. If the connection is PRINS, the cSEPP reformats the message in PRINS format and sets the Request URI to pRH-SEPP FQDN.

The pRH-SEPP receives the Access Token Get from cSEPP over two options. First, at block 137 it validates that the PLMN ID received in the Access Token Get belongs to the visited PLMN A as negotiated with cSEPP over N32c. For TLS, the pRH-SEPP recovers the rhNRF FQDN from the 3gpp.sbi.target.apiroot header and then, at block 138, sends the Access Token Get to the rhNRF by setting the authority header to rhNRF in case of direct communication, or if via SCP, it keeps the 3gpp.sbi.target.apiroot as rhNRF FQDN and sets the authority header to rh-SCP. For PRINS, the pRH-SEPP reformats the PRINS message to http and recovers the rhNRF FQDN, and then sets the authority header to rhNRF in case of direct communication, or sets the 3gbb.sbi.target.apiroot to rhNRF FQDN and the authority header to rh-SCP. The rhNRF then receives the Access Token Get either over direct communication or via rh-SCP.

At block 139, the rhNRF identifies target HPMN and, based on the configuration, forwards the Access Token Get to hNRF where originator of the service invocation to hNRF is the rhNRF.

At block 140, the rhNRF sends the Access Token Get to the cRH-SEPP either via direct communication or over rh-SCP. In this case, the 5GC NF in the visiting PLMN A, sends the Access Token Get to its local vNRF. For direct communication, the rhNRF sets the authority header to cRH-SEPP and the 3gpp.sbi.target.apiroot to hNRF. For indirect communication, the rhNRF sets the authority header to SCP and the 3gpp.sbi.target.abiroot to hNRF.

At block 142, the cRH-SEPP receives the Access Token Get and relays the request to the hSEPP; either over TLS or PRINS. For TLS: the cRH-SEPP sets the authority header to pSEPP and the 3gpp.sbi.target.apiroot to hNRF. For PRINS: the cRH-SEPP reformats the Access Token Get to PRINS format and sets the Request URI to pSEPP FQDN.

As per current 3GPP specification, if the security between the RH SEPP and the other SEPPs is based on TLS, the RH SEPP needs to use a dedicated certificate with a distinct identity (SAN FQDN) for each subset PLMN-IDs.

The pSEPP receives the Access Token Get from cRH-SEPP over two options: First, at block 143 the pSEPP validates that the PLMN ID received in Access Token Get belongs to one of the PLMN-IDs that was negotiated with the cRH-SEPP as can be served by the RH. For TLS, the pSEPP recovers the hNRF FQDN from the 3gpp.sbi.target.apiroot header and then, at block 144, sends the Access Token Get to the hNRF by setting the authority header to hNRF in case of direct communication or, if via SCP, it keeps 3gpp.sbi.target.apiroot as hNRF FQDN and sets the authority header to SCP. For PRINS, the pSEPP reformats the PRINS message to http and recovers the hNRF FQDN and then sets the authority header to hNRF in case of direct communication, or sets the 3gbb.sbi.target.apiroot to hNRF FQDN and the authority header to SCP in case of indirect communication.

The hNRF receives the Access Token Get either directly from pSEPP or through SCP if present. At block 145, the hNRF determines if the cAMF is authorized, and on validation, issues an Access Token. The hNRF processes the Access Token Get and, as the invoker of the service request, is a trusted rhNRF with a business relationship with the hNRF. The hNRF processes the Access Token Get and identifies the target NF Service Producer or Producers in the HPLMN network.

At block 146, hNRF sends the Access Token Response to the pSEPP either directly or via SCP.

The pSEPP performs topology hiding for the discovered NF service producer in HPLMN before sending the Access Token response to the cRH-SEPP at block 148 and then to the rhNRF at block 150.

At block 149, the cSEPP validates the PLMN-ID in the Access Token. At block 1504 the cSEPP sends the Access Token response to the rhNRF.

The RH can provide topology hiding service to its roaming customers. If that is the case, the cRH-SEPP performs the topology hiding before sending the Access Token response to rhNRF at block 150. Alternatively, this service can be done via the pRH-SEPP.

At block 152, rhNRF sends the Access Token to the pRH-SEPP, and at block 154, the pRH-SEPP sends the Access Token to cSEPP.

At block 155, the cSEPP validates the PLMN-ID in the Access Token. At block 156 the cSEPP sends the Access Token response to the vNRF.

At block 158, The vNRF sends the Access Token response to the NF Service Consumer, e.g., AMD, in the VPLMN network either directly or over SCP.

CAMF Service Request to pAUSF Via RH

FIG. 5C shows an implementation of logical flow for a cAMF Service Request to pAUSF via RH.

As shown in FIG. 5C, at block 162 the 5G CNF in the visiting PLMN A sends an cAMF Service Request to its local vSCP.

The local vSCP identifies that the target NF cAMF Service Request belongs to a foreign PLMN and based on local configuration, the vSCP is pointed to the hAUSF in the foreign PLMN B.

At block 164, the vSCP sends the cAMF Service Request to the visiting PLMN A local SEPP, i.e., cSEPP. Communication between the vSCP and the cSEPP can be a direct communication or via SCP. In case of direct communication, vSCP sets the 3gpp.target.sbi.apiroot header to hAUSF while it sets the authority header to vSCP. The vSCP is configured with the hAUSF FQDN. In case of indirect communication, the SCP sets the 3gpp.target.sbi.apiroot header to hAUSF while it sets the authority header to cSEPP. Because the 3gpp.target.sbi.apiroot header includes a foreign hAUSF, the SCP sets the authority header to cSEPP and keeps the 3gpp.target.sbi.apiroot header unchanged.

When cSEPP receives the cAMF Service Request with 3gpp.target.sbi.apiroot header pointing to the hASUF, at block 166 the cSEPP communicates the cAMF Service Request over N32-f to the pRH-SEPP. If the connection between cSEPP and pRH-SEPP is TLS only, the cSEPP sets the Authority header to pRH-SCP and leaves the 3gpp.target.sbi.apiroot header as is pointing to the hAUSF. If the connection is PRINS, the cSEPP reformats the message in PRINS format and sets the Request URI to rhAUSF FQDN.

The pRH-SEPP receives the cAMF Service Request from cSEPP over two options. First, at block 167 it validates that the PLMN ID received in the cAMF Service Request belongs to the visited PLMN A as negotiated with cSEPP over N32c. For TLS, the pRH-SEPP recovers the hAUSF FQDN from the 3gpp.sbi.target.apiroot header and then, at block 168, sends the cAMF Service Request to the rhSCP by setting the authority header to rhSCP in case of direct communication, or if via SCP, it keeps the 3gpp.sbi.target.apiroot as hAUSF FQDN and sets the authority header to rhSCP. For PRINS, the pRH-SEPP reformats the PRINS message to http and recovers the rhASUF FQDN, and then sets the authority header to rhAUSF in case of direct communication, or sets the 3gbb.sbi.target.apiroot to rhAUSF FQDN and the authority header to rhSCP. The rhSCP then receives the cAMF Service Request either over direct communication or via rh-SCP.

The rhSCP identifies target HPLMN and, based on the configuration, forwards the cAMF Service Request to hAUSF where the originator of the service invocation to the hAUSF is the rhSCP. At block 170, the rhSCP sends the cAMF Service Request to the cRH-SEPP either via direct communication or over rh-SCP. For direct communication, the rhSCP sets the authority header to cRH-SEPP and the 3gpp.sbi.target.apiroot to hAUSF. For indirect communication, the rhSCP sets the authority header to SCP and the 3gpp.sbi.target.abiroot to hAUSF.

The cRH-SEPP receives the cAMF Service Request and at block 172 relays the request to the pSEPP, either over TLS or PRINS. For TLS, the cRH-SEPP sets the authority header to pSEPP and the 3gpp.sbi.target.apiroot to hAUSF. For PRINS, the cRH-SEPP reformats the cAMF Service Request to PRINS format and sets the Request URI to pSEPP FQDN.

As per current 3GPP specification, if the security between the RH SEPP and the other SEPPs is based on TLS, the RH SEPP needs to use a dedicated certificate with a distinct identity (SAN FQDN) for each subset PLMN-IDs.

The pSEPP receives the CAMF Service Request from cRH-SEPP over two options. First, at block 173 the pSEPP validates that the PLMN ID received in cAMF Service Request belongs to one of the PLMN-IDs that was negotiated with the cRH-SEPP as can be served by the RH. For TLS, the pSEPP recovers the hAUSF FQDN from the 3gpp.sbi.target.apiroot header and then, at block 174, sends the cAMF Service Request to the hAUSF by setting the authority header to hAUSF in case of direct communication or if, as shown in FIG. 5C, via SCP it keeps 3gpp.sbi.target.apiroot as hAUSF FQDN and sets the authority header to SCP. For PRINS, the pSEPP reformats the PRINS message to http and recovers the hAUSF FQDN and then sets the authority header to hAUSF in case of direct communication, or sets the 3gbb.sbi.target.apiroot to hAUSF FQDN and the authority header to SCP in case of indirect communication.

The hASUF receives the cAMF Service Request either directly from pSEPP or, at block 176, through the hSCP if present. The hAUSF confirms the Service Request as reached target hAUSF with a Service Response Success message.

At block 180, hAUSF sends the Service Response Success message to the pSEPP either directly or via the hSCP.

If via the hSCP, as shown in FIG. 5C, at block 180, the hSCP sends the Service Response Success message to the pSEPP.

The pSEPP sends the Service Response Success message response to the cRH-SEPP at block 182.

At block 184, the cRH-SEPP sends the Service Response Success message response to the rhSCP. At block 186, rhSCP sends the Service Response Success message to the pRH-SEPP, and at block 188, the pRH-SEPP sends Service Response Success message to the cSEPP. At block 190 the cSEPP sends the Service Response Success message response to the vSCP. At block 192, The vSCP sends the Service Response Success message to the cAMF.

Solution 2

Figure 6:
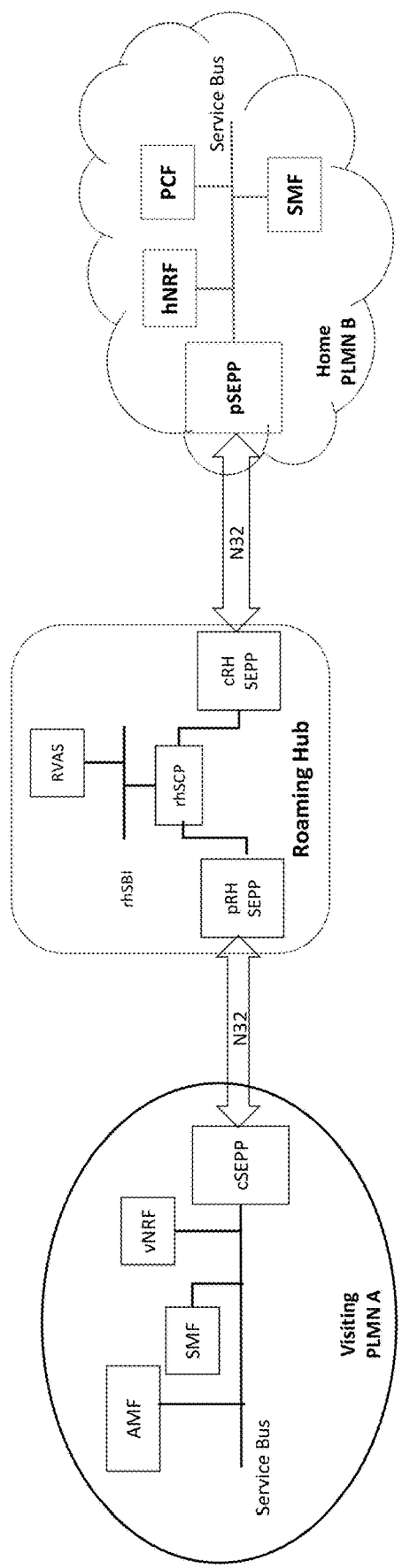
FIG. 6 shows an exemplary embodiment of an RH Architecture.

In another implementation, FIG. 6 shows an exemplary embodiment of an RH Architecture in accord with AA.73 Option 3. In the implementation, there is business communication between Visiting PLMN A and Home PLMN B. As shown in FIG. 6, FIGS. 7A-7C and FIG. 8, the RH SEPP is considered the producer RH SEPP with respect to the consumer SEPP of the visiting PLMN A. The cRH SEPP is considered the consumer RH SEPP with respect to the producer SEPP of the home PLMN B.

Figure 7A:
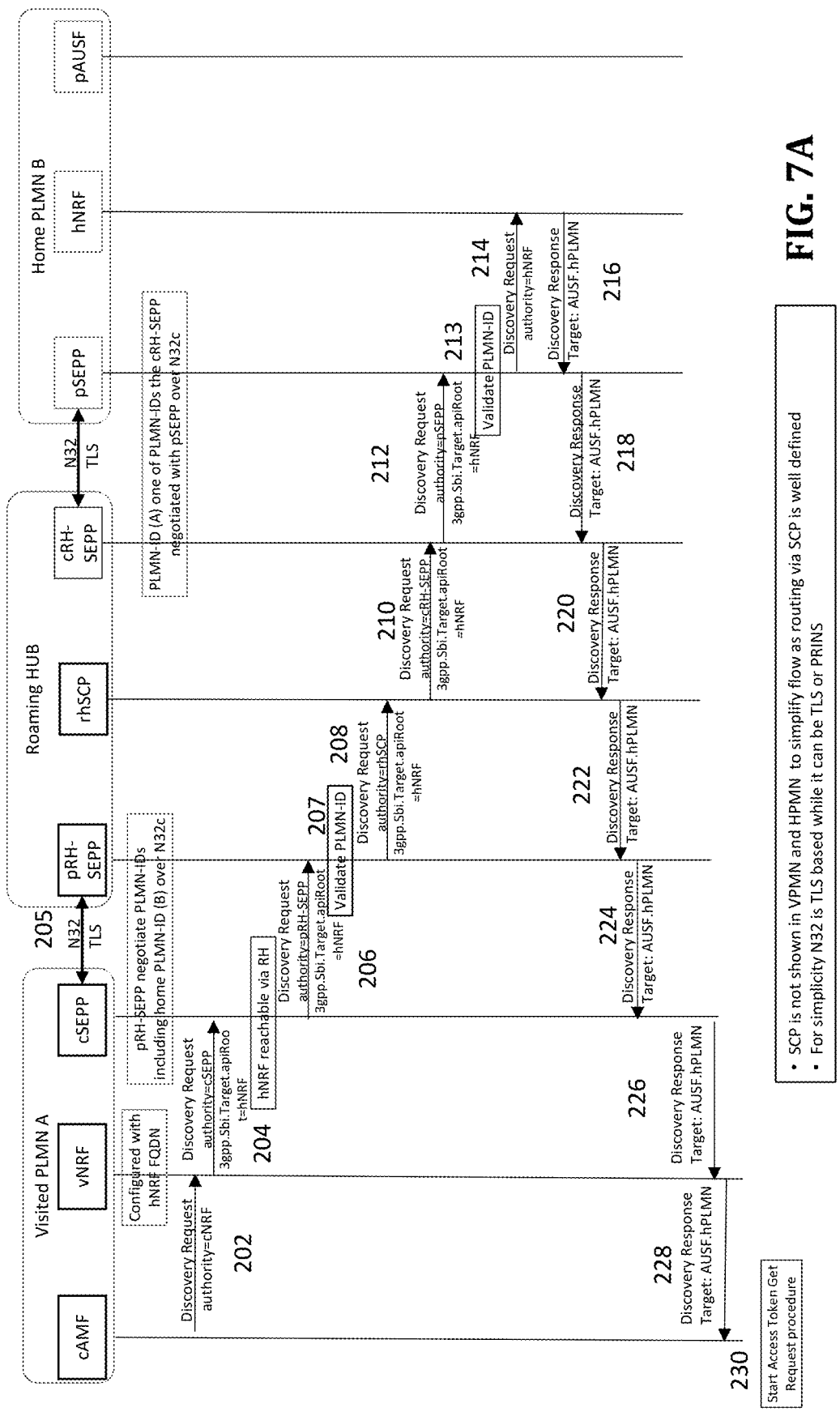
FIG. 7A shows a logical flow for a first option of NF Discovery in the Home PLMN via RH.
Figure 7B:
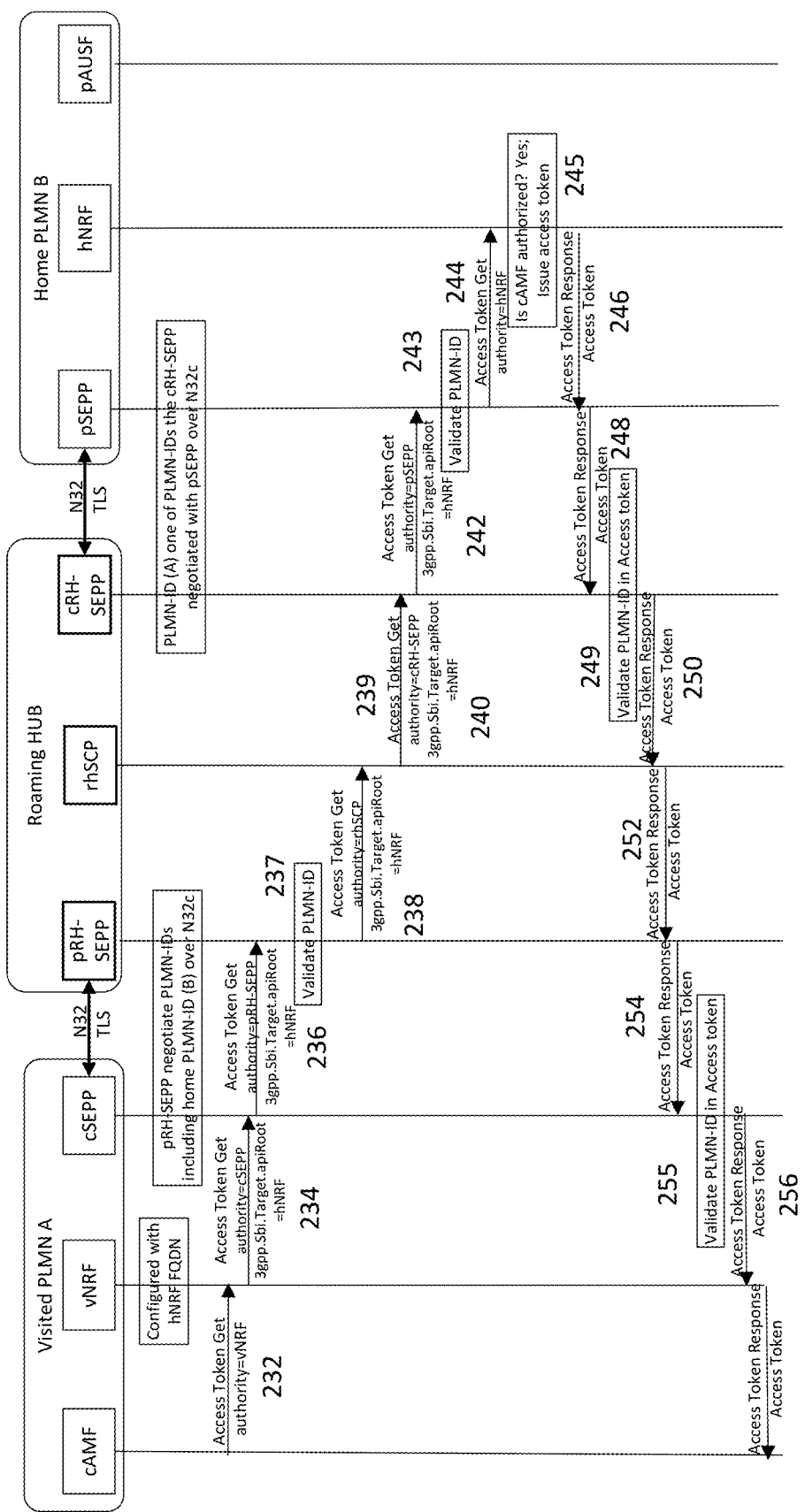
FIG. 7B shows a logical flow for an Access Token Request Get via RH.
Figure 7C:
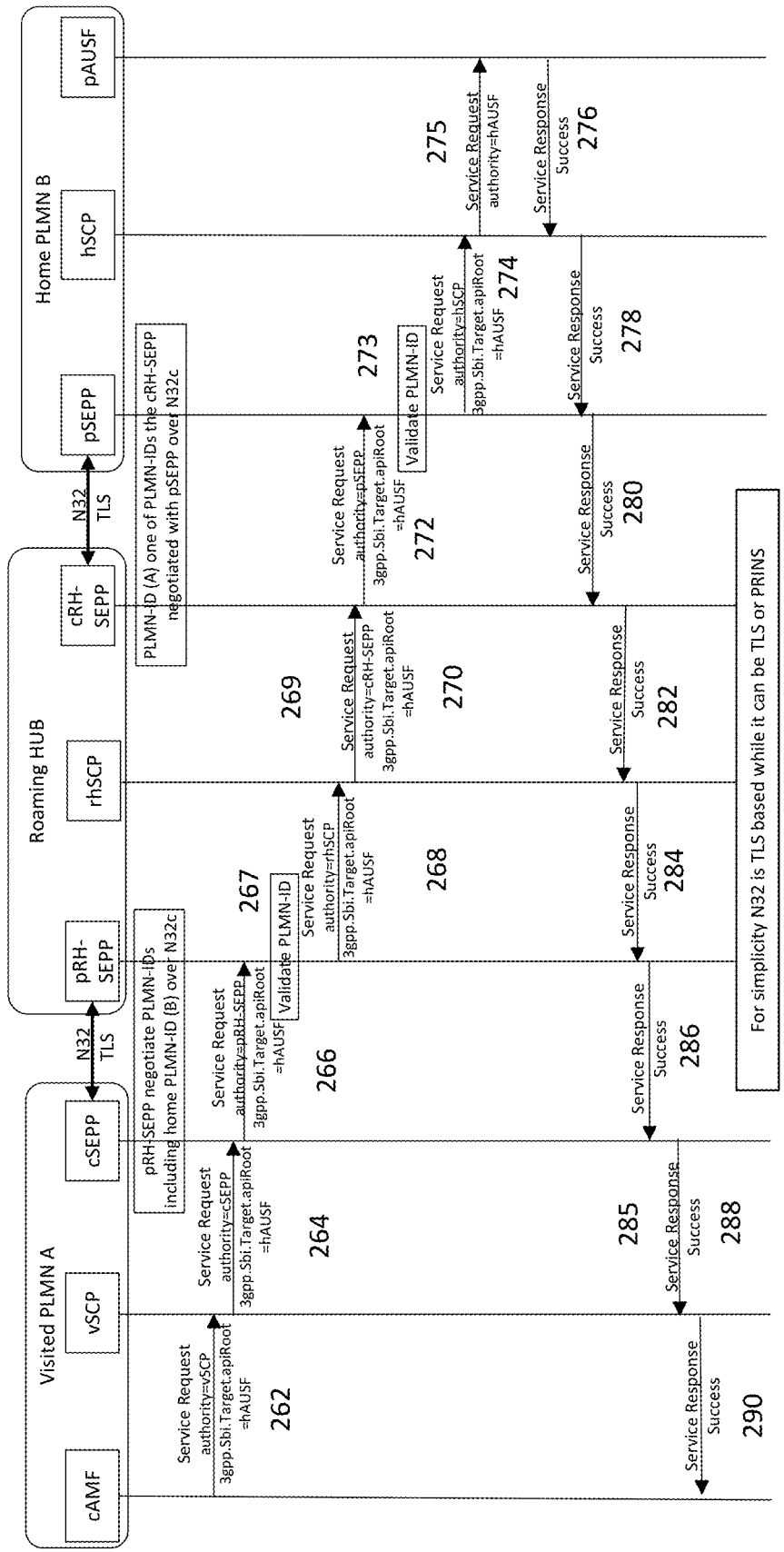
FIG. 7C shows a logical flow for a cAMF Service Request to pAUSF via RH.

FIGS. 7A-7C show an exemplary flow (Option 1) where the vNRF knows the reachability of hNRF (FQDN).

FIG. 7A shows a logical flow for a first option of NF Discovery in the Home PLMN via RH.

As shown in FIG. 7A, at block 202 the 5G CAMF in the visiting PLMN A sends a Discovery Request to its local vNRF with the CAMF authority header.

The local vNRF the vNRF knows the reachability of hNRF (FQDN), so the vNRF header is pointed to the PLMN B hNRF.

At block 204, the vNRF sends the Discovery Request to the visiting PLMN A local SEPP, i.e., cSEPP. Communication between the vNRF and the cSEPP can be a direct communication or via SCP. In case of direct communication, vNRF sets the 3gpp.target.sbi.apiroot header to hNRF while it sets the authority header to cSEPP. The vNRF is configured with the hNRF FQDN. In case of indirect communication, the vNRF sets the 3gpp.target.sbi.apiroot header to hNRF and it sets the authority header to SCP. Because the 3gpp.target.sbi.apiroot header includes the hNRF, the SCP sets the authority header to cSEPP and keeps the 3gpp.target.sbi.apiroot header unchanged. For purposes of simplifying the presentation, in FIGS. 7A-7B, the SCP and SCP routing flow is not shown in the VPMN and HPNM.

When the cSEPP receives the Discovery Request with 3gpp.target.sbi.apiroot header pointing to the hNRF, at block 205 the cSEPP establishes a new N32-c connection with a new N32-f (if one is not already established), and at block 206, communicates the Discovery Request over N32-f to the pRH-SEPP. If the connection between cSEPP and pRH-SEPP is TLS only, the cSEPP knows the hRNF is reachable by the RH, and sets the Authority header to pH-SEPP and leaves the 3gpp.target.sbi.apiroot header as is pointing to the hNRF. If the connection is PRINS, the cSEPP reformats the message in PRINS format and sets the Request URI to pRH-SEPP FQDN. As shown in FIGS. 7A-7C, for simplification of presentation, N32 is shown as TLS based, however it can be TLS or PRINS.

The pRH-SEPP receives the Discovery Request from cSEPP over two options. First, at block 107 it validates that the PLMN ID received in the Discovery Request belongs to the visited PLMN A as negotiated with cSEPP over N32c. For TLS, the pRH-SEPP obtains the hNRF FQDN from the 3gpp.sbi.target.apiroot header. At block 208, the pRH-SEPP sends the Discovery Request to the rhSCP and sets the authority header to rh-SCP. For PRINS, the pRH-SEPP reformats the PRINS message to http and sets the 3gbb.s-bi.target.apiroot to hNRF FQDN and the authority header to rh-SCP.

At block 210, the rh-SCP sends the Discovery request to the cRH-SEPP. For direct communication: rh-SCP sets the authority header to cRH-SEPP and the 3gpp.sbi.target.apiroot to hNRF. For indirect communication: rh-SCP NRF sets the authority header to SCP and the 3gpp.sbi.target.abiroot to hNRF.

At block 212, the cRH-SEPP receives the Discovery Request and relays the request to the hSEPP; either over TLS or PRINS. For TLS, the cRH-SEPP sets the authority header to pSEPP and the 3gpp.sbi.target.apiroot to hNRF. For PRINS, the cRH-SEPP reformats the Discovery Request to PRINS format and sets the Request URI to pSEPP FQDN.

As per current 3GPP specification, if the security between the RH SEPP and the other SEPPs is based on TLS, the RH SEPP needs to use a dedicated certificate with a distinct identity (SAN FQDN) for each subset PLMN-IDs.

The pSEPP receives the Discovery Request from cRH-SEPP over two options: First, at block 213 the pSEPP validates that the PLMN ID received in Discovery Request belongs to one of the PLMN-IDs that was negotiated with the cRH-SEPP as can be served by the RH. For TLS, the pSEPP recovers the hNRF FQDN from the 3gpp.sbi.target.apiroot header and then, at block 114, sends Discovery Request to the hNRF by setting the authority header to hNRF in case of direct communication or if via SCP it keeps 3gpp.sbi.target.apiroot as hNRF FQDN and sets the authority header to SCP. For PRINS, the pSEPP reformats the PRINS message to http and recovers the hNRF FQDN and then sets the authority header to hNRF in case of direct communication, or sets the 3gbb.sbi.target.apiroot to hNRF FQDN and the authority header to SCP in case of indirect communication.

The hNRF receives the Discovery request either directly from pSEPP or through SCP if present. The hNRF processes the Discovery Request and as the invoker of the service request is a trusted rhNRF with a business relationship with the hNRF, the hNRF processes the Discovery Request and identifies the target NF Service Producer or Producers in the HPLMN network.

At block 216, hNRF sends the Http Response to the pSEPP either directly or via SCP.

The pSEPP performs topology hiding for the discovered NF service producer in HPLMN before sending the Http response to the cRH-SEPP at block 218 and then to the rh-SCP at block 220.

The RH can provide topology hiding service to its roaming customers and if that is the case, the pRH-SEPP performs the topology hiding before sending the http response to rh-SCP.

At block 222, rh-SCP sends the response to the pRH-SEPP, and at block 224, the pRH-SEPP sends the Http response to cSEPP.

At block 226 the cSEPP sends the Http response to the vNRF.

At block 228, the vNRF sends the Discovery Response to the NF Service Consumer, e.g., cAMF, in the VPLMN network either directly or over SCP.

At block 230, The NF service consumer decides whether to allocate an access token or sends a service request to target NF service producer in HPLMN.

FIG. 7B shows a logical flow for a Access Token Request Get via RH.

As shown in FIG. 7B, at block 232 the 5G cAMF in the visiting PLMN A sends an Access Token Get to its local vNRF and is pointed to the hNRF for getting the Access Token from PLMN B hNRF.

At block 234, the vNRF sends the Access Token Get to the visiting PLMN A local SEPP, i.e., cSEPP. Communication between the vNRF and the cSEPP can be a direct communication or via SCP. In case of direct communication, vNRF sets the 3gpp.target.sbi.apiroot header to hNRF while it sets the authority header to cSEPP. The vNRF is configured with the hNRF FQDN. Because the 3gpp.target.sbi.apiroot header includes hNRF, the SCP having discovered or being configured with cSEPP; SCP sets the authority header to cSEPP and keeps the 3gpp.target.sbi.apiroot header unchanged.

When cSEPP receives the Access Token Get with 3gpp.target.sbi.apiroot header pointing to the hNRF, at block 236, the cSEPP communicates the Access Token Get over N32-f to the pRH-SEPP. If the connection between cSEPP and pRH-SEPP is TLS only, the cSEPP sets the Authority header to pRH-SEPP and leaves the 3gpp.target.sbi.apiroot header as is pointing to the hNRF. If the connection is PRINS, the cSEPP reformats the message in PRINS format and sets the Request URI to pRH-SEPP FQDN.

The pRH-SEPP receives the Access Token Get from cSEPP over two options. First, at block 237 it validates that the PLMN ID received in the Access Token Get belongs to the visited PLMN A as negotiated with cSEPP over N32c. For TLS, the pRH-SEPP obtains the hNRF FQDN from the 3gpp.sbi.target.apiroot header At block 238, pRH-SEPP sends the Access Token Get to the rh-SCP: it keeps the 3gpp.sbi.target.apiroot as hNRF FQDN and sets the authority header to rh-SCP. For PRINS, the pRH-SEPP reformats the PRINS message to http and sets the 3gbb.sbi.target.apiroot to hNRF FQDN and the authority header to rh-SCP. The rhSCP then receives the Access Token Get.

At block 239, the rhSCP identifies target HPMN and, based on the configuration, forwards the Access Token Get to hNRF.

At block 240, the rSCP sends the Access Token Get to the cRH-SEPP either via direct communication or over rh-SCP. In this case, the 5GC NF in the visiting PLMN A, sends the Access Token Get to its local vNRF. For direct communication. the rhNRF sets the authority header to cRH-SEPP and the 3gpp.sbi.target.apiroot to hNRF. For indirect communication, the rhNRF sets the authority header to SCP and the 3gpp.sbi.target.abiroot to hNRF.

At block 242, the cRH-SEPP receives the Access Token Get and relays the request to the hSEPP; either over TLS or PRINS. For TLS, the cRH-SEPP sets the authority header to pSEPP and the 3gpp.sbi.target.apiroot to hNRF. For PRINS, the cRH-SEPP reformats the Access Token Get to PRINS format and sets the Request URI to pSEPP FQDN.

As per current 3GPP specification, if the security between the RH SEPP and the other SEPPs is based on TLS, the RH SEPP needs to use a dedicated certificate with a distinct identity (SAN FQDN) for each subset PLMN-IDs.

The pSEPP receives the Access Token Get from cRH-SEPP over two options: First, at block 243 the pSEPP validates that the PLMN ID received in Access Token Get belongs to one of the PLMN-IDs that was negotiated with the cRH-SEPP as can be served by the RH. For TLS, the pSEPP recovers the hNRF FQDN from the 3gpp.sbi.target.apiroot header and then, at block 244, sends the Access Token Get to the hNRF by setting the authority header to hNRF in case of direct communication or, if via SCP, it keeps 3gpp.sbi.target.apiroot as hNRF FQDN and sets the authority header to SCP. For PRINS, the pSEPP reformats the PRINS message to http and recovers the hNRF FQDN and then sets the authority header to hNRF in case of direct communication, or sets the 3gbb.sbi.target.apiroot to hNRF FQDN and the authority header to SCP in case of indirect communication.

The hNRF receives the Access Token Get either directly from pSEPP or through SCP if present. At block 245, the hNRF determines if the cAMF is authorized, and on validation, issues an Access Token. The hNRF processes the Access Token Get and as the invoker of the service request is a trusted rhNRF with a business relationship with the hNRF, the hNRF processes the Access Token Get and identifies the target NF Service Producer or Producers in the HPLMN network.

At block 246, hNRF sends the Access Token Response to the pSEPP either directly or via SCP.

The pSEPP performs topology hiding for the discovered NF service producer in HPLMN before sending the Access Token response to the cRH-SEPP at block 248 and then to the rhSCP at block 250.

At block 249, the cSEPP validates the PLMN-ID in the Access Token. At block 1504 the cSEPP sends the Access Token response to the rhSCP.

The RH can provide topology hiding service to its roaming customers and if that is the case, the cRH-SEPP performs the topology hiding before sending the Access Token response to rhNRF at block 250. Alternatively, this service can be done via the pRH-SEPP.

At block 252, rhSCP sends the Access Token to the pRH-SEPP, and at block 154, the pRH-SEPP sends the Access Token to cSEPP.

At block 255, the cSEPP validates the PLMN-ID in the Access Token. At block 256 the cSEPP sends the Access Token response to the vNRF.

At block 258, The vNRF sends the Access Token response to the NF Service Consumer, e.g., AMD, in the VPLMN network either directly or over SCP.

FIG. 7C shows an implementation of logical flow for a cAMF Service Request to pAUSF via RH.

As shown in FIG. 7C, at block 262 the 5G cAMF in the visiting PLMN A sends an cAMF Service Request to its local vSCP. The local vSCP is pointed to the hAUSF in the foreign PLMN B.

At block 264, the vSCP sends the cAMF Service Request to the visiting PLMN A local SEPP, i.e., cSEPP. Communication between the vSCP and the cSEPP can be a direct communication or via SCP. In case of direct communication, vSCP sets the 3gpp.target.sbi.apiroot header to hAUSF while it sets the authority header to vSCP. The vSCP is configured with the hAUSF FQDN. In case of indirect communication, the SCP sets the 3gpp.target.sbi.apiroot header to hAUSF while it sets the authority header to cSEPP. Because the 3gpp.target.sbi.apiroot header includes a foreign hAUSF, the SCP sets the authority header to cSEPP and keeps the 3gpp.target.sbi.apiroot header unchanged.

When cSEPP receives the cAMF Service Request with 3gpp.target.sbi.apiroot header pointing to the hASUF, at block 266 the cSEPP communicates the cAMF Service Request over N32-f to the pRH-SEPP. If the connection between cSEPP and pRH-SEPP is TLS only, the cSEPP sets the Authority header to pRH-SCP and leaves the 3gpp.target.sbi.apiroot header as is pointing to the hAUSF. If the connection is PRINS, the cSEPP reformats the message in PRINS format and sets the Request URI to rhAUSF FQDN.

The pRH-SEPP receives the cAMF Service Request from cSEPP over two options. First, at block 267 it validates that the PLMN ID received in the cAMF Service Request belongs to the visited PLMN A as negotiated with cSEPP over N32c. For TLS, the pRH-SEPP recovers the hAUSF FQDN from the 3gpp.sbi.target.apiroot header and then, at block 168, sends the cAMF Service Request to the rhSCP by setting the authority header to rhSCP and keeps the 3gpp.sbi.target.apiroot as hAUSF FQDN. For PRINS, the pRH-SEPP reformats the PRINS message to http and then sets the authority header to hAUSF in case of direct communication, or sets the 3gbb.sbi.target.apiroot to rhAUSF FQDN and the authority header to rh-SCP. The rhSCP then receives the cAMF Service Request.

The rhSCP identifies target HPMN and, based on the configuration, forwards the cAMF Service Request to hAUSF where the originator of the service invocation to the hAUSF is the rhSCP. At block 270, the rhSCP sends the cAMF Service Request to the cRH-SEPP either via direct communication or over rh-SCP. For direct communication: rhSCP sets the authority header to cRH-SEPP and the 3gpp.sbi.target.apiroot to hAUSF. For indirect communication: rhSCP sets the authority header to hSCP and the 3gpp.sbi.target.abiroot to hAUSF.

The cRH-SEPP receives the cAMF Service Request and at block 272 relays the request to the pSEPP; either over TLS or PRINS. For TLS, the cRH-SEPP sets the authority header to pSEPP and the 3gpp.sbi.target.apiroot to hAUSF. For PRINS, the cRH-SEPP reformats the cAMF Service Request to PRINS format and sets the Request URI to pSEPP FQDN.

As per current 3GPP specification, if the security between the RH SEPP and the other SEPPs is based on TLS, the RH SEPP needs to use a dedicated certificate with a distinct identity (SAN FQDN) for each subset PLMN-IDs.

The pSEPP receives the CAMF Service Request from cRH-SEPP over two options. First, at block 273 the pSEPP validates that the PLMN ID received in cAMF Service Request belongs to one of the PLMN-IDs that was negotiated with the cRH-SEPP as can be served by the RH. For TLS, the pSEPP recovers the hAUSF FQDN from the 3gpp.sbi.target.apiroot header and then, at block 274, sends the cAMF Service Request to the hAUSF by setting the authority header to hAUSF in case of direct communication or if, as shown in FIG. 7C, via SCP, it keeps 3gpp.sbi.target.apiroot as hAUSF FQDN and sets the authority header to SCP. For PRINS, the pSEPP reformats the PRINS message to http and recovers the hAUSF FQDN and then sets the authority header to hAUSF in case of direct communication, or sets the 3gbb.sbi.target.apiroot to hAUSF FQDN and the authority header to SCP in case of indirect communication.

The hASUF receives the cAMF Service Request either directly from pSEPP or, at block 275, through the hSCP if present. The hAUSF confirms the Service Request as reached target hAUSF with a Service Response Success message.

At block 276, hAUSF sends the Service Response Success message to the pSEPP either directly or via the hSCP. If via the hSCP, as shown in FIG. 7C, at block 278, the hSCP sends the Service Response Success message to the pSEPP.

The pSEPP sends the Service Response Success message response to the cRH-SEPP at block 280.

At block 282, the cRH-SEPP sends the Service Response Success message response to the rhSCP. At block 284, rhSCP sends the Service Response Success message to the pRH-SEPP, and at block 286, the pRH-SEPP sends Service Response Success message to the cSEPP. At block 288 the cSEPP sends the Service Response Success message response to the vSCP. At block 290, The vSCP sends the Service Response Success message to the cAMF.

Figure 8:
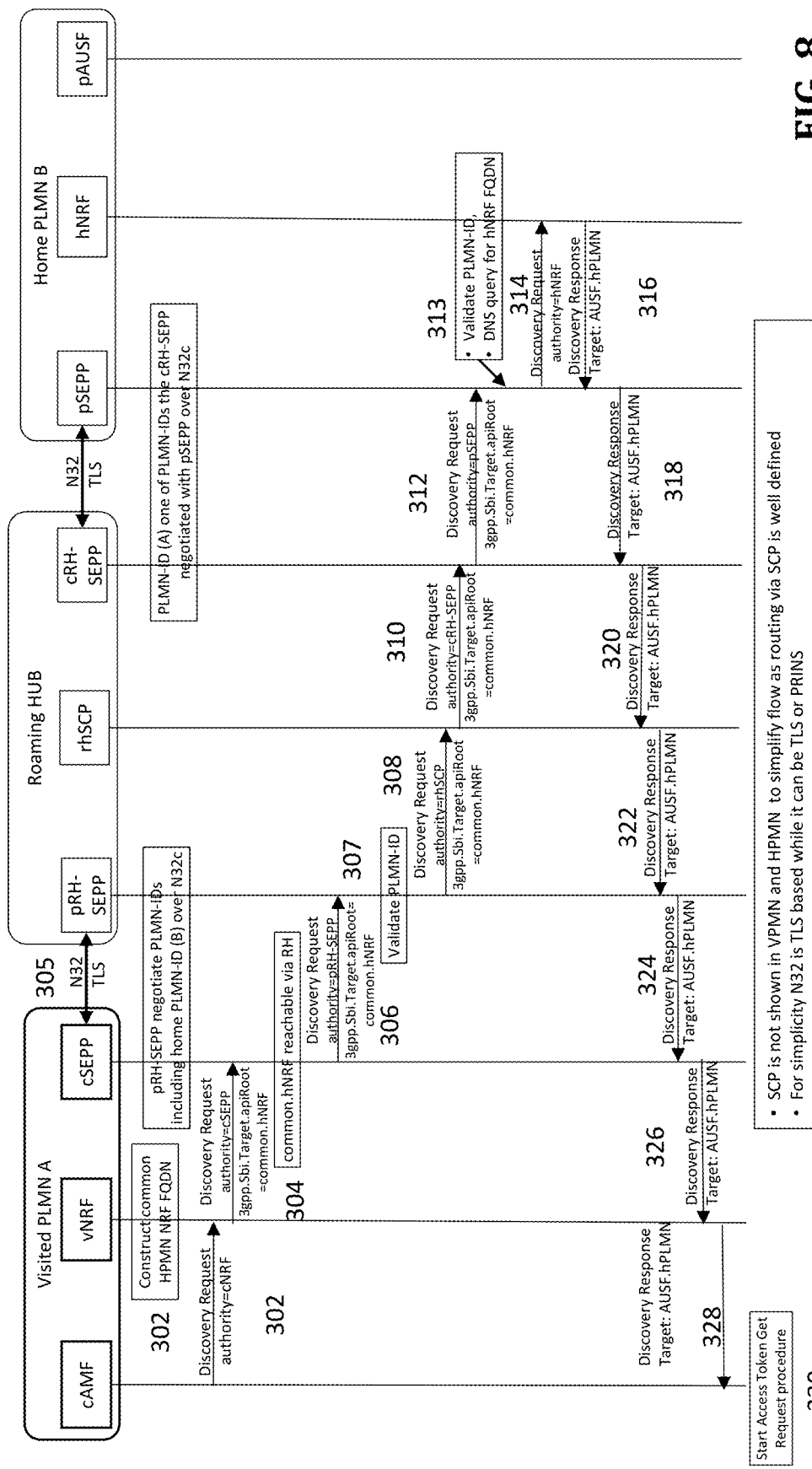
FIG. 8 shows NF Discovery in the Home PLMN via RH.

FIG. 8 shows an exemplary flow (Option 2) where the vNRF constructs a common FQDN for hNRF that can be used by pSEPP to enquire HPMN DNS for the serving hNRF FQDN.

FIG. 8 shows NF Discovery in the Home PLMN via RH.

As shown in FIG. 8, at block 302 the 5G CNF in the visiting PLMN A sends a Discovery Request to its local vNRF with the CAMF authority header. At block 303, the local vNRF constructs a common HPMN NRF FQDN, so the vNRF header is pointed to the common hNRF. At block 304, the vNRF sends the Discovery Request to the visiting PLMN A local SEPP, i.e., cSEPP, with the common hNRF being reachable by the RH. Communication between the vNRF and the cSEPP can be a direct communication or via SCP. In case of direct communication, vNRF sets the 3gpp.target.sbi.apiroot header to the common hNRF while it sets the authority header to cSEPP. In case of indirect communication, the vNRF sets the 3gpp.target.sbi.apiroot header to the common hNRF and it sets the authority header to SCP. Because the 3gpp.target.sbi.apiroot header includes the common hNRF, SCP sets the authority header to cSEPP and keeps the 3gpp.target.sbi.apiroot header unchanged. For purposes of simplifying the presentation, in FIG. 8, the SCP and SCP routing flow is not shown in the VPMN and HPNM.

When cSEPP receives the Discovery Request with 3gpp.target.sbi.apiroot header pointing to the common hNRF, at block 305 the cSEPP establishes a new N32-c connection with a new N32-f (if one is not already established), and at block 306, communicates the Discovery Request over N32-f to the pRH-SEPP. If the connection between cSEPP and pRH-SEPP is TLS only, the cSEPP knows the common hRNF is reachable by the RH, and sets the Authority header to pH-SEPP and leaves the 3gpp.target.sbi.apiroot header as is pointing to the common hNRF. If the connection is PRINS, the cSEPP reformats the message in PRINS format and sets the Request URI to pRH-SEPP FQDN. As shown in FIGS. 8A-8C, for simplification of presentation, N32 is shown as TLS based, however it can be TLS or PRINS.

The pRH-SEPP receives the Discovery Request from cSEPP over two options. First, at block 307 it validates that the PLMN ID received in the Discovery Request belongs to the visited PLMN A as negotiated with cSEPP over N32c. For TLS, the pRH-SEPP obtains the common hNRF FQDN from the 3gpp.sbi.target.apiroot header. At block 308, the pRH-SEPP sends the Discovery Request to the rhSCP and sets the authority header to rh-SCP. For PRINS, the pRH-SEPP reformats the PRINS message to http and sets the 3gbb.sbi.target.apiroot to the common hNRF FQDN and the authority header to rh-SCP.

At block 310, the rh-SCP sends the Discovery request to the cRH-SEPP. For direct communication: rh-SCP sets the authority header to cRH-SEPP and the 3gpp.sbi.target.apiroot to the common hNRF. For indirect communication: rh-SCP NRF sets the authority header to SCP and the 3gpp.sbi.target.abiroot to the common hNRF.

At block 312, the cRH-SEPP receives the Discovery Request and relays the request to the hSEPP; either over TLS or PRINS. For TLS: the cRH-SEPP sets the authority header to pSEPP and the 3gpp.sbi.target.apiroot to the common hNRF. For PRINS: the cRH-SEPP reformats the Discovery Request to PRINS format and sets the Request URI to pSEPP FQDN.

As per current 3GPP specification, if the security between the RH SEPP and the other SEPPs is based on TLS, the RH SEPP needs to use a dedicated certificate with a distinct identity (SAN FQDN) for each subset PLMN-IDs.

The pSEPP receives the Discovery Request from cRH-SEPP over two options: First, at block 313 the pSEPP validates that the PLMN ID received in Discovery Request belongs to one of the PLMN-IDs that was negotiated with the cRH-SEPP as can be served by the RH. For TLS, the pSEPP perfoms a DNS query for the hNRF FQDN based on the common hNRF from the 3gpp.sbi.target.apiroot header and then, at block 314, sends Discovery Request to the identified hNRF by setting the authority header to hNRF in case of direct communication or, if via SCP, it keeps 3gpp.sbi.target.apiroot as the identified hNRF FQDN and sets the authority header to SCP. For PRINS, the pSEPP reformats the PRINS message to http and performs a DNS search for the hNRF FQDN and then sets the authority header to hNRF in case of direct communication, or sets the 3gbb.sbi.target.apiroot to the identified hNRF FQDN and the authority header to SCP in case of indirect communication.

The hNRF receives the Discovery request either directly from pSEPP or through SCP if present. The hNRF processes the Discovery Request and as the invoker of the service request is a trusted rhNRF with a business relationship with the hNRF, the hNRF processes the Discovery Request and identifies the target NF Service Producer or Producers in the HPLMN network.

At block 316, hNRF sends the Http Response to the pSEPP either directly or via SCP.

The pSEPP performs topology hiding for the discovered NF service producer in HPLMN before sending the Http response to the cRH-SEPP at block 318 and then to the rh-SCP at block 320.

The RH can provide topology hiding service to its roaming customers and if that is the case, the pRH-SEPP performs the topology hiding before sending the http response to rh-SCP.

At block 322, rh-SCP sends the response to the pRH-SEPP, and at block 224, the pRH-SEPP sends the Http response to cSEPP.

At block 326 the cSEPP sends the Http response to the vNRF.

At block 328, the vNRF send the Discovery Response to the NF Service Consumer, e.g., AMD, in the VPLMN network either directly or over SCP.

At block 330, The NF service consumer decides whether to allocate an access token or sends a service request to target NF service producer in HPLMN.

As the target AUSF hPLMN is identified in FIG. 8, under option 2 the Access Token Get request via the RH proceeds in the same manner as described with respect to FIG. 7B. The cAMF Service Request to pAUSF via RH proceeds as shown with respect the 7C.

Roaming Hub Solution Architecture—RVAS

In an implementation, an RVAS application Function can be configured to support SBA and SBI. The RVAS policy can be configured at rhSCP, where the SCP can be configured to either look up local configuration, another database, or an RVAS application to identify whether the received message needs to be forwarded to the RVAS application function. If "Yes", the rhSCP sends the message to the RVAS Application.

It will be understood that implementations and embodiments can be implemented by computer program instructions. These program instructions can be provided to a processor to produce a machine, such that the instructions, which execute on the processor, create means for implementing the actions specified herein. The computer program instructions can be executed by a processor to cause a series of operational steps to be performed by the processor to produce a computer-implemented process such that the instructions, which execute on the processor to provide steps for implementing the actions specified. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the invention.

What is claimed is:

1. A method comprising:
   accepting a 5G connection message from a visited Public Line Mobile Network (vPLMN) for a home PLMN (hPLMN) at a hosted Roaming Hub (RH) having a roaming agreement with each of the vPLMN and the hPLMN, the hPLMN not having an agreement with the vPLMN;
   establishing a 5G connection between a vPLMN and an hPLNM via the RH, wherein the Roaming Hub (RH) comprises a RH Service Communication Proxy (rh-SCP) and a hosted RH SEPP including a plurality of SEPP instances, the hosted SEPP comprising:
   a RH producer SEPP (pRH SEPP) including an interface to the vPLMN SEPP; and
   a RH consumer SEPP (cRH SEPP) including an interface to a home PLMN SEPP,
   wherein the pRHSEPP is configured to establish 5G interconnectivity between any vPLMN and hPLMN that has a roaming agreement with the RH.

2. The method of to claim 1, wherein a Network Repository Function (NRF) of the vPLMN (vNRF) is configured to generate the connection message targeting an NRF within the RH (rhNRF).

3. The method of claim 2, wherein the rhNRF is configured to target the connection message for a NRF of the HPLNM (hNRF) and forward the connection message to the hPLNM.

4. The method according to claim 3, wherein a Security Edge Protection Proxy (SEPP) of the RH is configured to accept and validate a PLNM-ID of the connection message from the vPLNM.

5. The method of claim 3, wherein a SEPP of the hPLMN is configured to validate a PLNM-ID of the connection message.

6. The method of claim 1, wherein a NRF of the vPLMN (vNRF) is configured to generate a common fully qualified domain name (FQDN) for a NRF of the hPLNM (hNRF) based on a PLMN-ID of the hPLMN.

7. A method comprising:
   accepting a 5G connection message from a vPLMN for an hPLNM at a RH having a roaming agreement with each of the vPLMN and the hPLMN, the hPLMN having a roaming agreement with the vPLNM;
   establishing a 5G connection between a vPLMN and an hPLNM via the RH; wherein the Roaming Hub (RH) comprises a RH Service Communication Proxy (rh-SCP) and a hosted RH SEPP including a plurality of SEPP instances, the hosted SEPP comprising:
   a RH producer SEPP (pRH SEPP) including an interface to the vPLMN SEPP; and a RH consumer SEPP (cRH SEPP) including an interface to a home PLMN SEPP,
wherein the pRHSEPP is configured to establish 5G interconnectivity between any vPLMN and PLMN that has a roaming agreement with the RH.

8. The method according to claim 7, wherein a NRF of the vPLMN (vNRF) is aware of the reachability of a NRF of the hPLNM (hNRF).

9. The method according to claim 7, wherein the RH does not include or use a NRF of the RH (rhNRF).

10. A system comprising:
a Roaming Hub (RH) comprising the RH comprising a RH Service Communication Proxy (rhSCP) and a hosted RH SEPP including a plurality of SEPP instances, the hosted SEPP comprising:
  a RH producer SEPP (pRH SEPP) including an interface to a visiting PMN (vPLMN) SEPP; and
  a RH consumer SEPP (cRH SEPP) including an interface to a home PLMN SEPP,
  wherein the pRHSEPP is configured to establish 5G interconnectivity between any visiting PLMN and home PLMN that has a roaming agreement with the RH.

11. The system of claim 10, wherein the pRH-SEPP is configured to advertise to the vPLMN a plurality of HPLMN PLMN-IDs for all HPLMNs that can have subscribers roam into the VPLMN and ensure only allowed PLMN-IDs are negotiated during a 5G interconnect connection setup.

12. The system of claim 10, wherein the system is configured to generate and message a certificate of the pRH-SEPP that includes a RH PLMN-ID and a plurality of VPLMN PLMN-IDs of all VPLMNs that the RH represents towards the HPMN.

13. The system of claim 10, wherein the system is configured to generate and message a cRH-SEPP certificate that includes the RH PLMN-ID and a plurality of HPLNM PLMN-IDs of all HPMNs that the RH represents towards the VPMN.

14. The system of claim 10, wherein the rhSCP is configured as a single rhSCP instance.

15. The system of claim 10, wherein the rhSCP configured to operate as a micro-service of the rhSEPP.

16. The system of claim 10 wherein an RH Service Based Interface (rhSBI) bus is extended within the RH between the pRH-SEPP and cRH-SEPP and is configured to allow the pRH-SEPP to terminate traffic over to the rhSBI towards the rhSCP.

17. The system of claim 10 wherein an rhSBI bus is configured to allow the cRH-SEPP to communicate with HPMN pSEPP based on a 3GPP 5G interconnect protocol with security mode of a Transport Layer Security (TLS) protocol or a Protocol for N32 Interconnect Security (PRINS).

18. The system of claim 10, further comprising a Roaming Value Added Services (RVAS) application, wherein the rhSCP is configured to offload all routing criteria to the RVAS.

19. The system of claim 10, further comprising:
an rhNRF; and
an rhSBI bus, the rhSBI bus connecting the rhNRF and the rhSCP.

* * * * *